(12) United States Patent
Berndt et al.

(10) Patent No.: US 6,456,195 B1
(45) Date of Patent: Sep. 24, 2002

(54) VEHICLE LIGHTING CONTROL SYSTEM

(76) Inventors: Dennis L. Berndt, 3901 Doral La., Elkhart, IN (US) 46517; Emil J. Doczy, 23521 Lakeview Dr., Edwardsburg, MI (US) 49112

( * ) Notice: Subject to any disclaimer, the term of this patent is extended or adjusted under 35 U.S.C. 154(b) by 0 days.

(21) Appl. No.: 09/141,652

(22) Filed: Aug. 28, 1998

Related U.S. Application Data (60) Provisional application No. 60/056,291, filed on Sep. 3, 1997.

(51) Int. Cl.⁷ ............................................. B60Q 1/28
(52) U.S. Cl. ..................... 340/468; 340/469; 307/10.8; 307/10.1
(58) Field of Search ................................ 340/468, 457, 340/457.2, 469; 307/10.8, 10.1

(56) References Cited

U.S. PATENT DOCUMENTS

| | | | |
|---|---|---|---|
| 4,968,895 A | * 11/1990 | Leclercq | 307/10.8 |
| 4,985,660 A | * 1/1991 | Cronk | 315/82 |
| 5,027,001 A | * 6/1991 | Torbert | 307/10.1 |
| 5,030,884 A | * 7/1991 | Roussey et al. | 315/83 |
| 5,120,981 A | * 6/1992 | Cope | 307/10.8 |
| 5,168,196 A | * 12/1992 | Briggette et al. | 315/82 |
| 5,187,383 A | * 2/1993 | Taccetta et al. | 307/10.8 |
| 5,374,852 A | * 12/1994 | Parkes | 307/10.8 |

* cited by examiner

Primary Examiner—Daryl Pope
(74) Attorney, Agent, or Firm—Baker & Daniels (57) ABSTRACT

A vehicle lighting control system according to the present invention includes an electronic module connected to the vehicle lighting and windshield wiper systems which provides daytime running lamps (high beams at fifty percent power) during normal, daytime operation a full complement of vehicle lights including the running lights and low beam headlights at full power, when the wiper system is activated. The full complement of lights is deactivated by turning off the ignition switch or turning the wiper switch to the "OFF" position, turning the headlight switch to the "ON" position, and then turning the headlight switch to the "OFF" position. As such, the driver is prevented from inadvertently shutting off the full complement of lighting in a low visibility situation. The present invention also incorporates an automatic delay feature which allows the driver to wash the windshield in non-rain conditions without activating the full complement of lights. In the event the windshield wipers continue to operate past the thirty second time period, the system activates the full complement of lights.

11 Claims, 7 Drawing Sheets

VEHICLE LIGHTING CONTROL SYSTEM

This Application claims benefit of Provisional Application 60/056,291 filed Sep. 3, 1997.

The present invention relates generally to a system for use on motor vehicles having Daytime Running Lights (DRLs). More particularly, the present invention coordinates the operation of the DRLs with the operation of the vehicle's headlights, taillights, running lights, and windshield wipers.

BACKGROUND OF THE INVENTION

Many of today's motor vehicles are equipped with a safety feature known as Daytime Running Lights (DRLs) in which the headlights are activated at reduced power whenever the ignition is on. DRLs greatly increase the visibility of the vehicle in all conditions, although the increased visibility is most advantageous in low light conditions, such as during rainy or heavily overcast days. Tests have shown that the improved visibility of DRL equipped vehicles substantially decreases the likelihood that the vehicles will be involved in accidents.

Unfortunately, DRLs also tend to increase the likelihood that drivers will forget to enable the vehicle's full power headlights when the ambient light decreases to a point that full power headlights are necessary. For example, a driver operating a DRL equipped vehicle during the day may forget to switch the headlights to full power when it gets dark or begins to rain because the light provided by the reduced power headlights seems sufficient under the gradually changing ambient lighting conditions. As a result, the vehicle is less visible to other vehicles and the road is insufficiently illuminated for the driver. Also, in the rain, the DRL equipped vehicle is not visible from the rear because DRLs do not activate the taillights or other running lights. The driver's field of vision and depth perception may be adversely affected, yet the driver may remain unaware of his impaired visibility, and believe that the full compliment of full power headlights, taillights, and running lights are activated. On many vehicles, such as large commercial trucks and tractor-trailer rigs, the consequences of running on DRL's in low visibility conditions can create accident prone situations.

SUMMARY OF THE INVENTION

The present invention provides a vehicle lighting control system which controls the operation of the DRLs, the headlights, the taillights, and the running lights in relation to the driver's selection of lighting and windshield wiper control settings so as to ensure adequate lighting under various driving conditions and to prevent the driver from inadvertently failing to conform his lighting selection to the current driving conditions. The present control system provides DRLs (high beams at fifty percent power) during normal, daytime operation. When the windshield wipers are activated, the DRL circuit is deactivated, and the full complement of vehicle lights are activated, i.e. the taillights, running lights, and low beam headlights at full power. Moreover, the driver retains full control over the lighting system, and may override the system to switch to full power lights at any time by simply activating the normal headlight switch.

As a safety feature, the driver must consciously deactivate the full lighting system after it is activated by the windshield wiper switch. The driver may deactivate the system by turning off the ignition switch or by switching back to the DRL mode by turning the wiper switch to the "OFF" position, turning the headlight switch to the "ON" position, and then turning the headlight switch to the "OFF" position. Alternatively, the driver can switch back to DRL mode by depressing an optional "kill" switch. As such, the driver is generally prevented from inadvertently shutting off the full complement of lights in a low visibility situation.

The present invention also incorporates an automatic thirty second delay feature that allows the driver to wash the windshield in non-rain conditions without activating the headlights, taillights, and running lights. In the event the windshield wipers continue to operate past the thirty second time period, the system activates the full complement of lights.

Thus, a motor vehicle equipped with the lighting control system of the present invention is more visible at all times than are comparable vehicles equipped with the standard DRL systems. The control system of the present invention also ensures that drivers will not inadvertently operate under low light conditions with inadequate lighting, and will also ensure that drivers will not inadvertently deactivate the full complement of vehicle lights at the wrong time.

Accordingly, it is an object of this invention to provide a vehicle lighting control system that integrates the control of DRLs, headlights, taillights, running lights, and windshield wipers into a single integrated system.

It is another object of this invention to provide a control system for motor vehicles that automatically activates the full power lighting system of the vehicle when the windshield wipers are activated.

A further object of this invention is to provide a lighting control system for motor vehicles that essentially prevents inadvertent deactivation of the full power lighting system.

BRIEF DESCRIPTION OF THE DRAWINGS

These and other objects and advantages of the present invention, and the manner of attaining them, will become more apparent and the invention will be better understood upon reading the following description in conjunction with the drawings wherein.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE INVENTION

The embodiments disclosed below are not intended to be exhaustive or to limit the invention to the precise forms disclosed in the following detailed description. Rather, the embodiments are chosen and described so that others skilled in the art may utilize their teachings.

Figure 1:
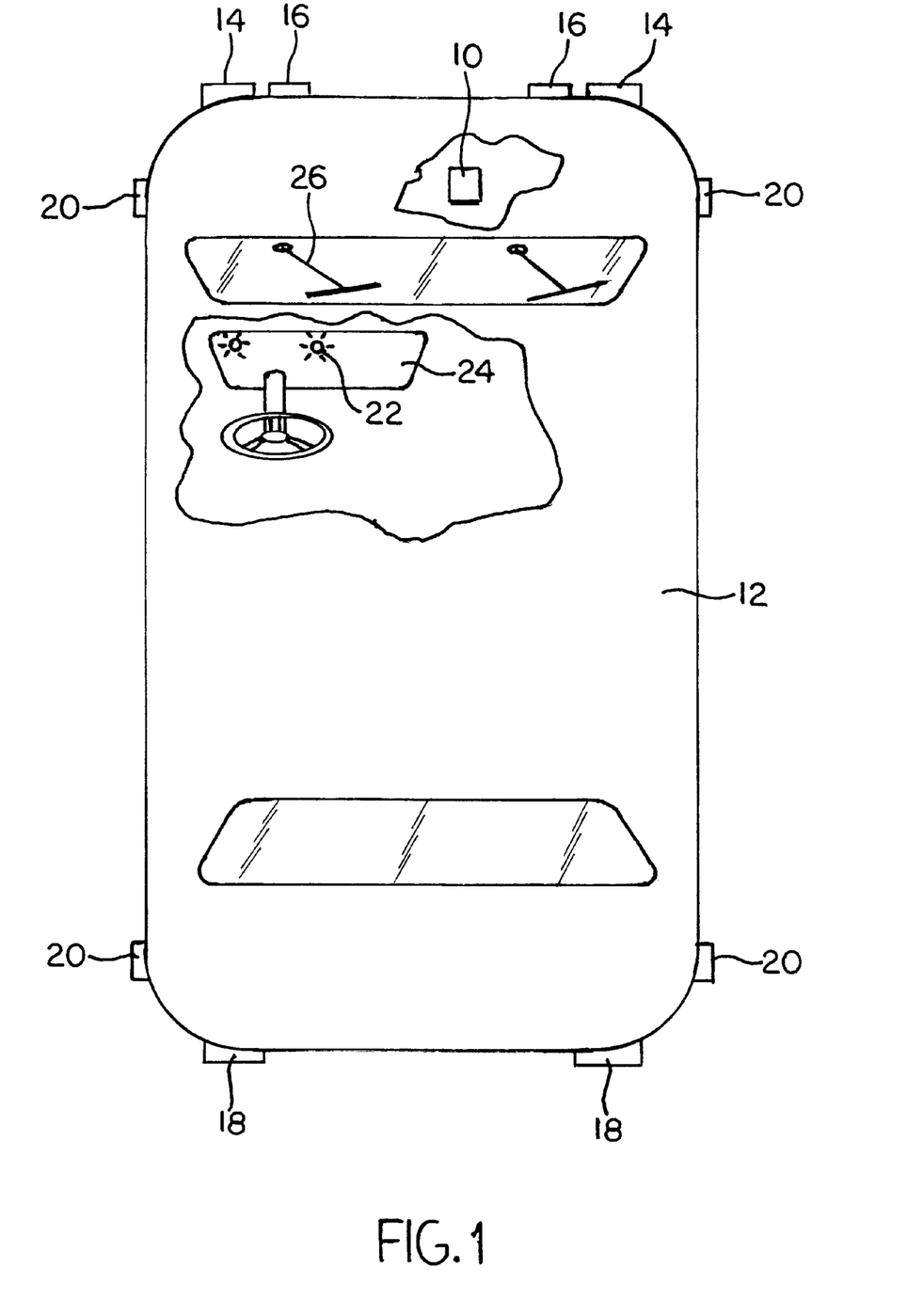
FIG. 1 is a fragmented, top plan view of the control system of the present invention mounted to a vehicle.
Figure 2:
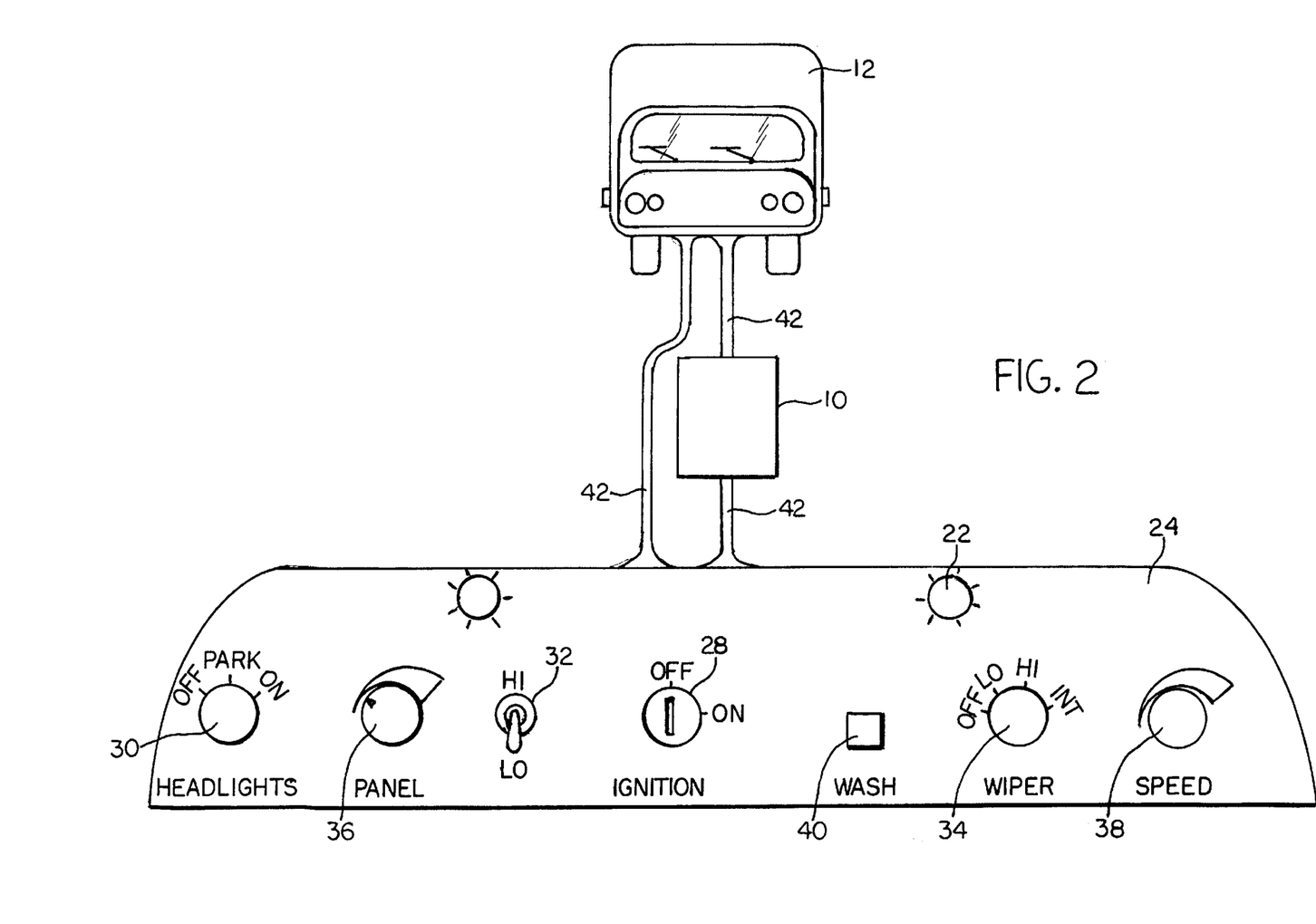
FIG. 2 is a conceptual view of controls for operating the present invention.

FIG. 1 shows the present vehicle lighting control system which includes a box or module generally designated 10 mounted to a vehicle 12 having low beam headlights 14, high beam headlights 16, (which also serve as daytime running lamps as will be further described below), taillights 18, running lights 20, panel lights 22 mounted to the dash board 24, and windshield wipers 26. As best shown in FIG. 2, dash board 24 includes standard control switches and buttons including an ignition switch 28, a headlight switch 30, a high/low beam selection switch 32, a windshield wiper switch 34, a panel light intensity control 36, a wiper speed control 38, and a momentary-on, windshield wiper wash button 40. Wire harnesses 42 interconnect the various controls, system module 10, and the vehicle lighting system and windshield wiper system.

Figures 3, 3A:
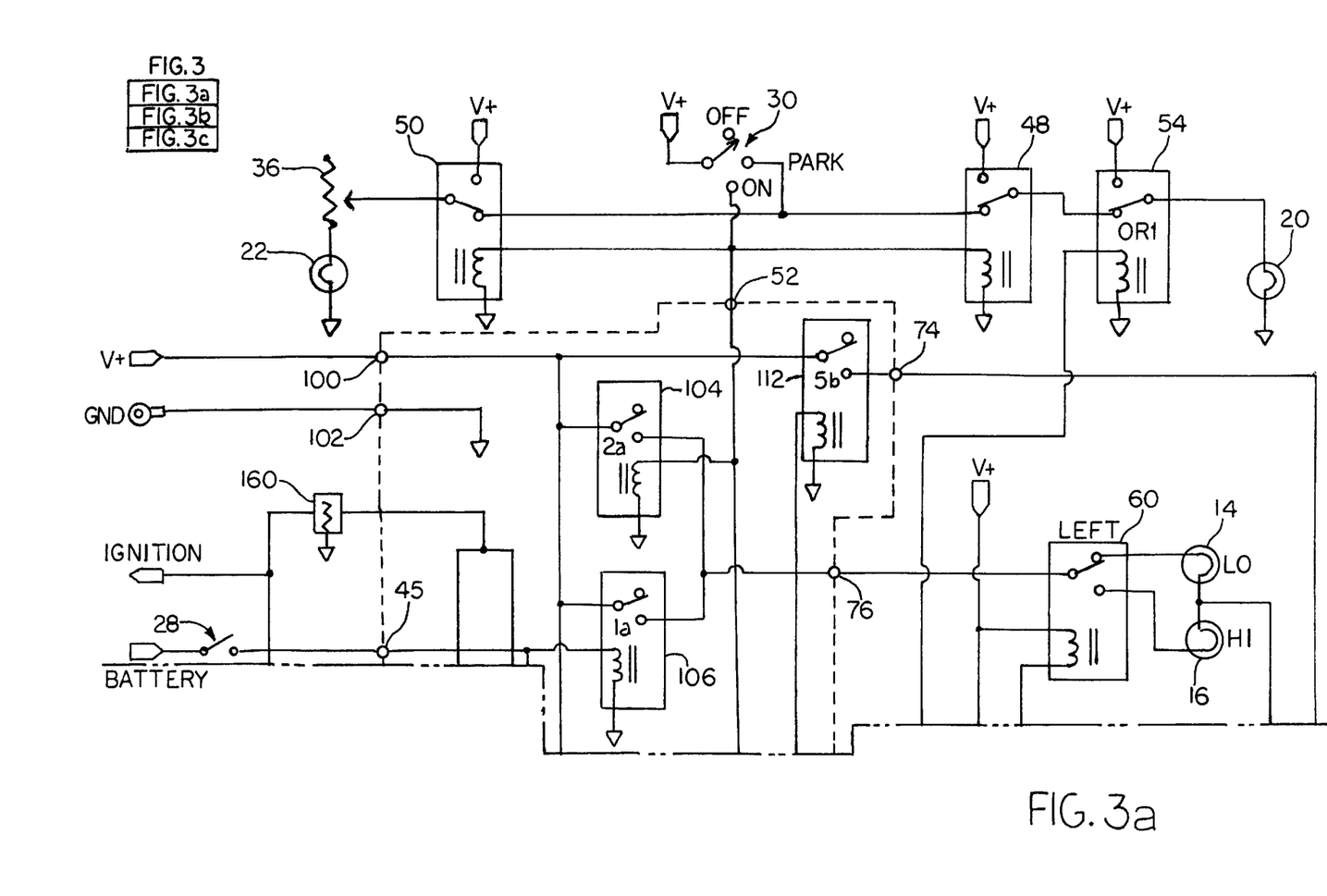
FIG. 3 is a schematic diagram of a control system according to the present invention connected to a vehicle lighting and windshield wiper system.
Figure 3B:
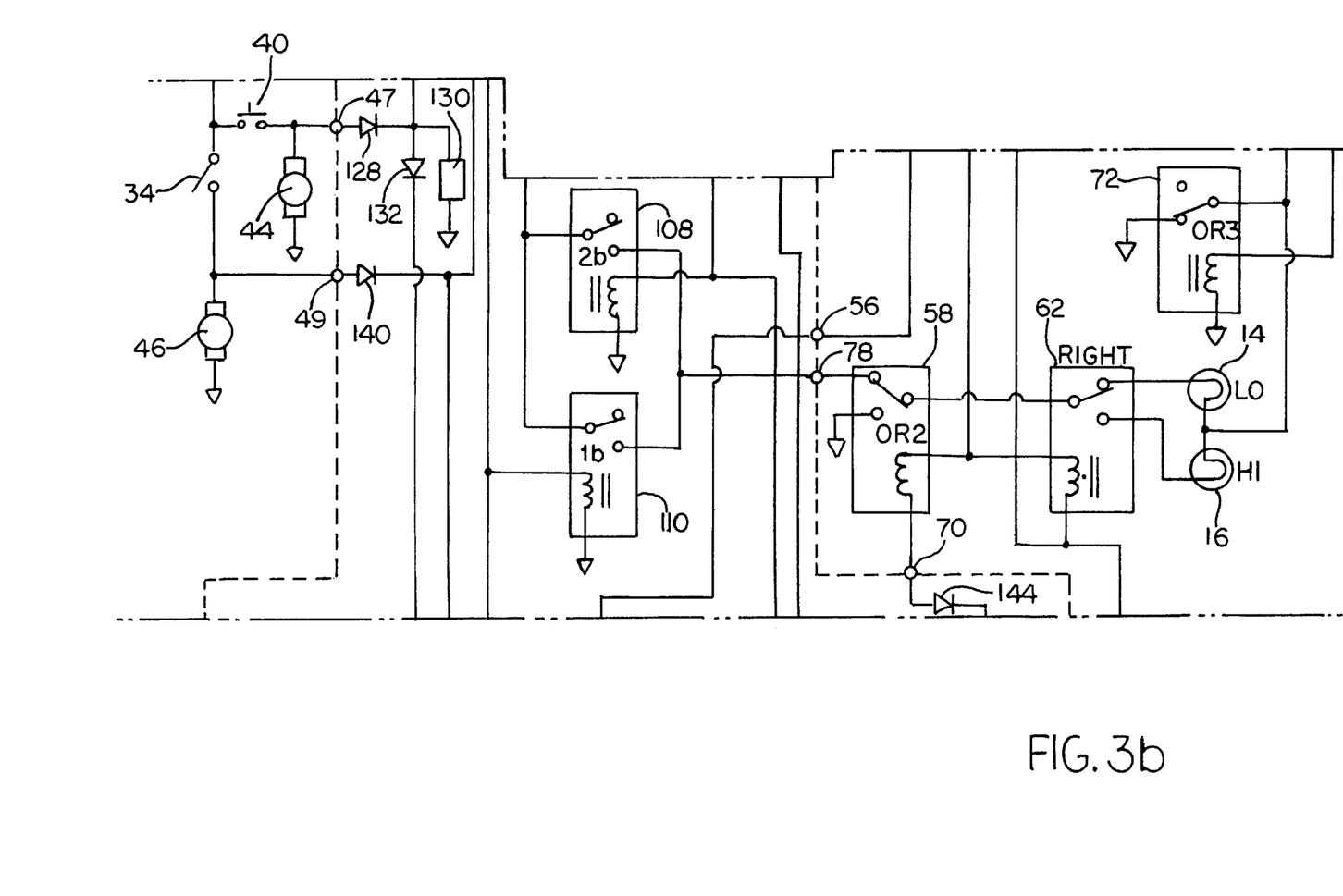
Figure 3C:
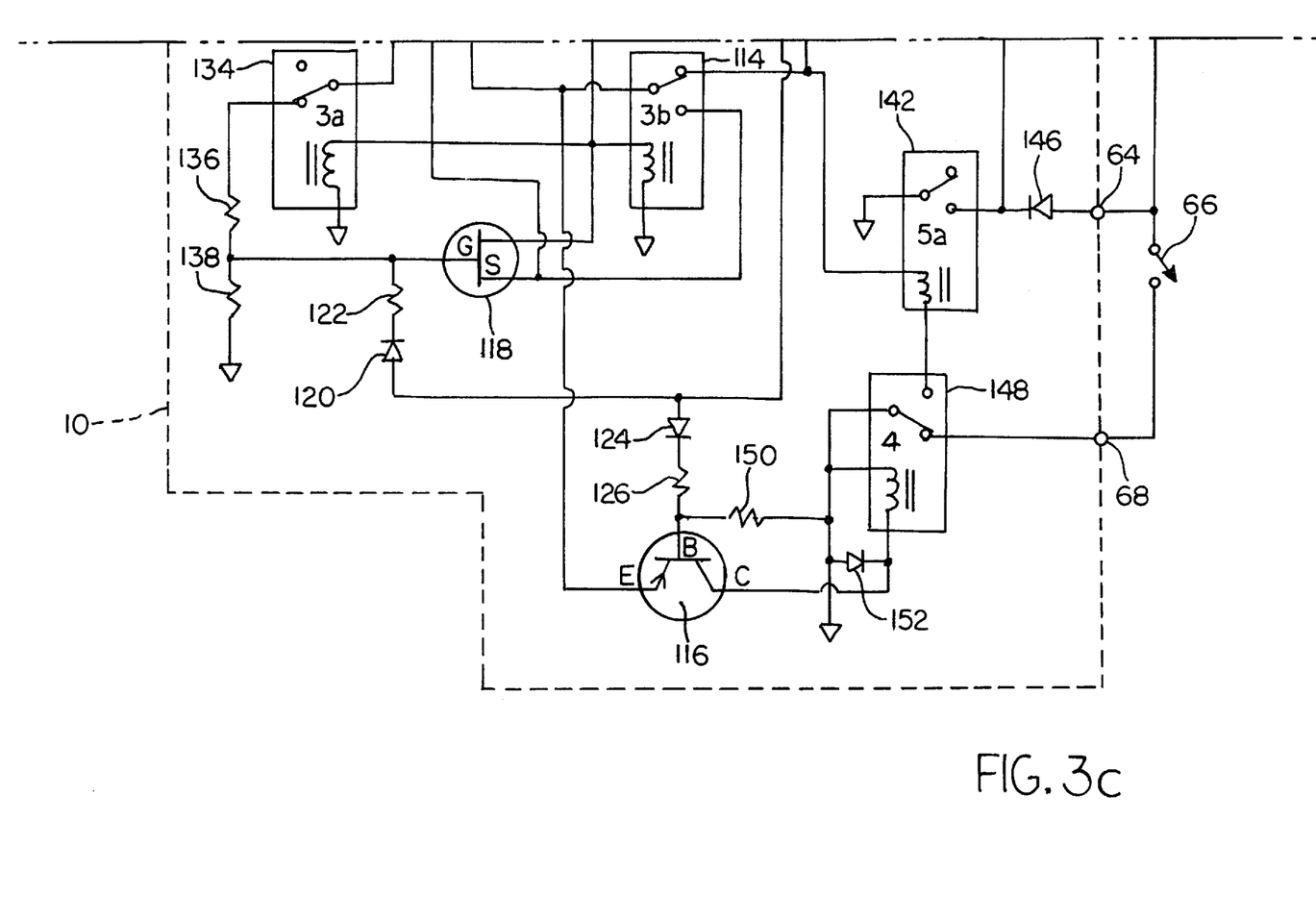

FIG. 3 shows an embodiment of the present system 10 interconnected with a vehicle lighting system and a vehicle windshield wiper system. The vehicle ignition switch 28 enables the system as described below. Ignition switch 28 is connected on one side to battery power and on the other side to the vehicle ignition system (not shown), wash button 40, wiper switch 34, and pin 45 of module 10. When depressed, wash button 40 connects ignition switch 28 output to a wash motor 44 for actuating a pump (not shown), and module pin 47. When wiper switch 34 is switched into a selected one of its "ON" positions, it connects the ignition switch output to a wiper motor 46 and pin 49.

The lighting system includes headlight switch 30 which switches system power (generally designated +V) at its input between an "OFF" pole, a "PARK" pole, and an "ON" pole. The "PARK" pole is connected to the normally closed (NC) pole of relay 48 and the NC pole of relay 50. The normally opened (NO) poles of both relays 48, 50 are connected to V+. Headlight switch 30 "ON" pole is connected to the coil high side of relays 48, 50 to apply V+ when headlight switch 30 is in the "ON" position, thereby activating the relays and connecting the relay common poles to V+. The "ON" pole is also connected to pin 52 of module 10.

The common pole of relay 50 is connected to the wiper of intensity control 36. Panel lights 22 (only one shown) are connected between intensity control 36 and ground. The common pole of relay 48 is connected to the NC pole of relay 54 which switches power to running lights 20 (only one shown). The coil high side of relay 54 is connected to output pin 56 of module 10. Also, the coil high sides of relay 58, left headlight relay 60, and right headlight relay 62 are connected to V+. The coil low sides of left and right headlight relays 60, 62 are connected to pin 64 of module 10. A dimmer switch 66 is connected between pin 64 and pin 68. The coil low side of relay 58 is connected to pin 70 of module 10. The left low beam 14 is connected between the NC pole of relay 60 and the high beam 16, which is connected to the NO pole of relay 60. The right side lights are similarly connected. The node between the left side headlights 14, 16 is connected to the node between the right side headlights 14, 16, and routed to the common pole of relay 72. The NC pole of relay 72 is connected to ground and the NO pole is opened. Relay 72 is activated by the signal from pin 74 of module 10. The common pole of left relay 60 is connected to output pin 76. The common pole of right relay 62 is connected to the common pole of relay 58, which is normally connected to pin 78 of module 10.

Module power is connected to module 10 at pin 100 and ground at pin 102, as shown in FIG. 3. Power is routed internal to module 10 to the common poles of relays 104, 106, 108, 110, and 112. Power is also switched into module 10 from ignition switch 28 through pin 45. Pin 45 is connected to the coil high side of relays 106 and 110, the common pole of relay 114, and the emitter of transistor 116. Power from headlight switch 30 is routed through pin 52 to the coil high side of relays 104 and 108, the gate of transistor 118 through diode 120 and resistor 122, and the base of transistor 116 through diode 124 and resistor 126. The NO pole of relay 104 and the NO pole of relay 106 are connected to output pin 76. Relays 108 and 110 are similarly connected to output pin 78. The NO pole of relay 112 is connected to pin 74 and enables relay 72 as described herein.

Pin 47 from wash button 40 is connected through diode 128 to RC delay network 130 and diode 132. Network 130 provides a time delay, for example, thirty seconds, before charging to a level required to actuate transistor 118 as explained below. Diode 132 is connected to the common pole of relay 134. The NC pole of relay 134 is connected to a voltage divider network including resistors 136, 138 which is connected to the gate of transistor 118. The source of transistor 118 is supplied by pin 49 (through diode 140) which is also connected to the NO pole of relay 114. The drain of transistor 118 enables relay 114 at its coil high side and is connected to output pin 56.

Pins 70 and 64 are connected the NO pole of relay 142 through diodes 144 and 146, respectively. The common pole of relay 142 is connected to ground. The coil high side of relay 142 is connected to the NC pole of relay 114 and the low side is connected to the NO pole of relay 148. The NC pole of relay 148 is connected to pin 68, and the common pole is connected, along with the coil high side, resistor 150, and the anode of diode 152, to ground. The coil low side of relay 148 is connected to the cathode of diode 152 and the collector of transistor 116. Finally, resistor 150 is connected to the base of transistor 116.

Mode of Operation

Figure 4A:
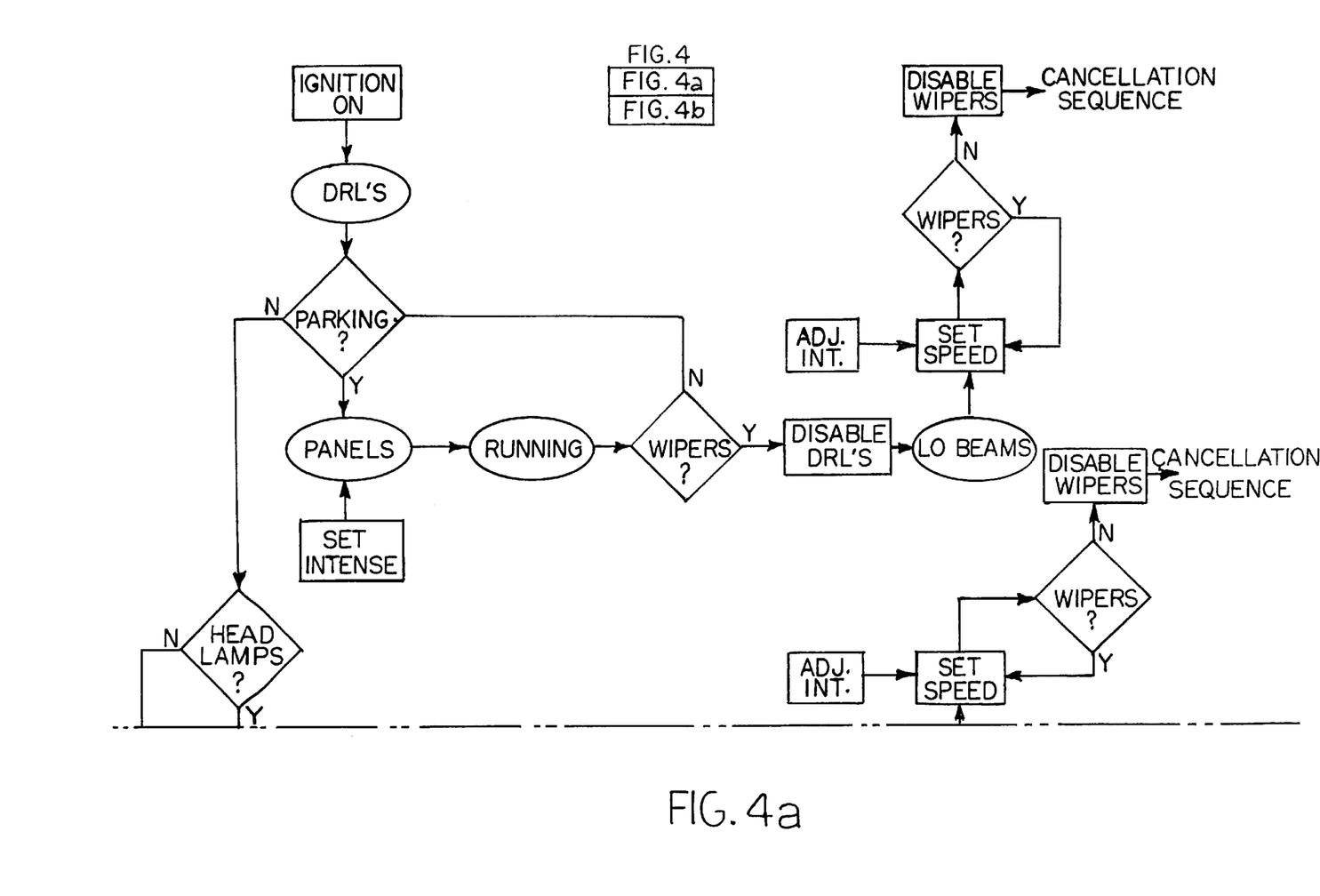
FIG. 4 is a flow diagram of the operation of the system of FIG. 3.
Figure 4B:
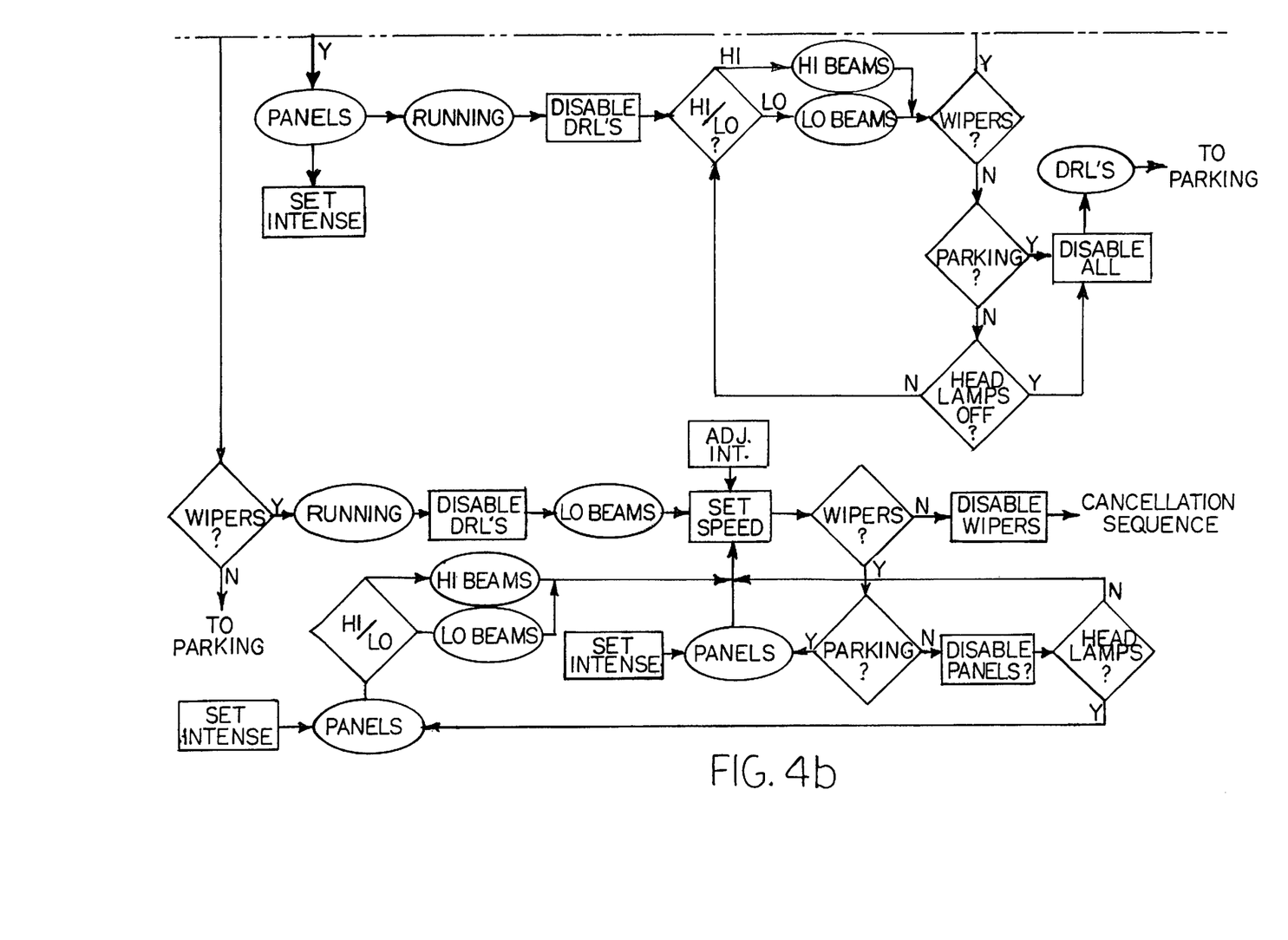

FIG. 4 is a flow diagram representing the operation of the present system 10. System 10 is enabled by switching ignition switch 28 to the "ON" position. High beams 16 are automatically placed in daytime running lamp (DRL) mode. As shown in FIG. 3, when ignition switch 28 is switched "ON," power is applied to pin 45 (through relay 114) to activate relay 142, thereby connecting the coil low side of relays 60 and 62 to ground through diode 146, and the coil low side of relay 58 to ground through diode 144. Since the coil high side of each relay 58, 60, 62 is connected to V+, the relays are activated and power is applied across high beams 16 in series from the V+, through relay 106 (activated by power from ignition switch 28), pin 76, relay 60, left high beam 16, right high beam 16, relay 62, to ground through relay 58.

The normally present connection to ground through relay 72 between left and right high beams 16 is broken (thereby connecting the lights in series) because activation of relay 142 also activates relay 112. Relay 142 is activated because transistor 116 is biased in a normally "ON" configuration so that power from ignition switch 28 flows through transistor 116 to the coil low side of relay 148. The coil of relay 148 provides a path to ground, and the relay is sealed by diode 152. When relay 148 switches, relay 142 is activated because its coil low side is connected to ground. Since relay 142 and relay 112 are coupled for simultaneous operation, relay 112 switches position to provide power to the coil high side of relay 72. Relay 72 is thus activated and the common pole is switched to the NO pole.

With high beams 16 connected in series, each light receives one-half the power normally provided for full brightness. Thus, high beams 16 shine at half power to provide the DRL function. The system remains in this mode of operation so long as headlight switch 30 is in the "OFF" position and wiper switch 34 is in the "OFF" position.

As shown in FIG. 4, when headlight switch 30 is placed in the "PARK" position, panel lights 22 and running lights 20 are enabled. Power to panel lights 22 is provided from headlight switch 30 through the NC pole of relay 50 to the wiper of intensity control 36. The intensity of panel lights 22 depends upon the position of the wiper according to principles well known in the art. Running lights 20 are powered through the NC pole of relay 48 and the NC pole of relay 54. As the flow diagram suggests, system 10 will remain in this mode of operation until either wiper switch 34 is activated or the position of headlight switch 30 is changed.

If wiper switch 34 is moved to the "ON" position, the system activates low beams 14 instead of the DRLs, and enables windshield wipers 26. Power is supplied through wiper switch 34 to wiper motor 46 which controls the wipers in the standard manner. Power also flows through pin 49, across diode 140, and into the source of transistor 118 which is forward biased "ON." The drain activates relay 114 which connects battery power to the source of the transistor. A sealing circuit is thereby provided wherein power will remain continuously applied to the source of transistor 118, even after wiper switch 34 is switched off. Activation of relay 114 deactivates relay 142, which simultaneously deactivates relay 112 as explained above. When relay 142 opens as shown in FIG. 3, the path to ground for relays 58, 60, and 62 is broken, thereby deactivating those relays. Deactivation of relay 112 deactivates relay 72 which then supplies a common path to ground for the node connecting the left high and low beam headlights and the node connecting the right high and low beam headlights. The drain of transistor 118 also provides power to the coil high side of relay 54 which switches to V+ to power running lights 20.

Power from ignition switch 28 energizes relays 106 and 110 which connect V+ to left relay 60 (through pin 76 of module 10) and relay 58 (through pin 78 of module 10), respectively. Relay 58 connects V+ to right relay 62. Power flows through left low beam 14 and right low beam 14 to ground through relay 72. Thus, as indicated by FIG. 4, running lights 20 remain activated and low beams 14 are activated.

The system continues to operate as described above until wiper switch 34 is turned to the "OFF" position. Of course, if wiper switch 34 is turned to the "HI" or "INT" position, the speed of motor 46 is adjusted accordingly. When wiper switch 34 is switched to the "OFF" position, power is removed from motor 46 thereby disabling wipers 26. However, power remains connected to the source of transistor 118 from relay 114 which has been sealed in an activated state as explained above. Thus, transistor 118 drain continues to activate relay 54 and running lights 20. Headlights 14 remain powered until the user completes a cancellation sequence wherein wiper switch 34 is switched to the "OFF" position and headlight switch 30 is switched first to the "ON" position, and then to the "OFF" position. When wiper switch 34 is off and headlight switch 30 is on, power is applied from headlight switch 30 through pin 52, diode 124 and resistor 126 to the base of transistor 116. Power is similarly applied through diode 120 and resistor 122 to the gate of transistor 118. Both transistors are disabled. Vehicle dimmer switch 66 is used to switch between low and high beams. When headlight switch 30 is returned to the "OFF" position, the system returns to DRL operation as described above. Obviously, all lighting and wiper operation may be stopped simultaneously at any time by switching ignition switch 28 to the "OFF" position. Additionally, an optional "kill" switch could readily be included to return the system to DRL mode.

As shown in FIG. 4, if after ignition switch 28 is switched on, headlight switch 30 is switched to the "ON" position rather than the "PARK" position, panel lights 22 and running lights 20 are activated and either the low beams headlights 14 or the high beam headlights 16 are activated. Panel lights 22 are activated when power from headlight switch 30 is applied to relay 50. The intensity of the lights is adjustable using intensity control 36. Running lights 20 are powered by relay 48 which, once activated, supplies power through the NC pole of relay 54. Headlight switch 30 also deactivates relay 148 by applying power to the base of transistor 116 through diode 124 and resistor 126. Consequently, relay 142 is deactivated, thereby removing the path to ground at the coil low side of relays 58, 60, and 62. These relays return to their normally closed positions shown in FIG. 3. Deactivation of relay 142 simultaneously deactivates relay 112, which deactivates relay 72 to provide a path to ground for the nodes connecting the low beams to the high beams. Power from switch 30 also activates relays 104 and 108. Relay 104 closes and supplies power (through left relay 60) to left low beam 14. Relay 108 similarly supplies power (through relay 58 and right relay 62) to right low beam 14.

As shown in the flow diagram of FIG. 4, system 10 remains in normal headlight operation until the operator switches headlight switch 30 to "PARK" or "OFF," switching the system to DRL mode, or switches wiper switch 34 to "ON," activating wipers 26. As should be apparent from the foregoing during normal headlight operation, when the operator switches wiper switch 34 to the "ON" position, only wipers 26 are activated since panel lights 22, running lights 20, and headlights 14 are already activated. If the wipers are activated while the system is operating in normal headlight mode, the cancellation sequence to return to DRL mode simply requires the operator to switch wiper switch 34 to "OFF," then switch the headlight switch 30 to either "PARK" or "OFF."

Referring again to the flow diagram of FIG. 4, an additional ignition sequence occurs when ignition switch 28 is switched on (which results in DRL mode as explained above), headlight switch 30 is left off, and wiper switch 34 is switched on. Under these circumstances, running lights 20 are powered through relay 54 which is activated by transistor 118. The DRL mode is disabled when relay 114 provides the sealing circuit for transistor 118, deactivating relays 142, 112, 58, 60, 62, and 72. Low beams 14 are then activated as power from relays 106 and 110 flows through low beams 14 and relay 72 to ground.

If headlight switch 30 is later switched to "PARK," panel lights 22 are activated as explained above. If, instead, headlight switch 30 is switched to "ON," the panel lights are activated and the operator can switch between low beams 14 and high beams 16 by activating switch 66. In any event, after wiper switch 34 is switched to the "OFF" position, the operator can return to DRL mode by either switching the headlight switch 30 to the "PARK" or "OFF" position (if the headlight switch was in the "ON" position when the wipers were switched off) or switching the headlight switch first to the "ON" position and then to the "PARK" or "OFF" position (if switch 30 was in the "OFF" position when switch 34 was switched off).

An additional feature of the present system is the wash mode (not shown in the flow diagram of FIG. 4). When the operator cleans the windshield or otherwise temporarily operates the wipers 26, it is desirable to remain in DRL mode (when outdoor lighting conditions are good). System 10 provides a time period following operation of wash button 40 during which the operator may activate wipers 26 without activating the full complement of lights (i.e., low beams 14, running lights 20, and panel lights 22) as would normally occur upon activation of wiper switch 34. When wash button 40 is depressed, power from ignition switch 28 flows through diode 128 to the RC time constant provided by block 130 and to the gate of transistor 118 through diode 132, relay 134, and resistor 136. Transistor 118 is disabled. RC time constant 130 is charged and continues to apply sufficient voltage to the gate of transistor 118 when wash button 40 is released. RC time constant 130 applies such a voltage for a predetermined time period (for example, thirty seconds) according to principles commonly known in the art. During this time period, when wiper switch 34 is switched to the "ON" position, power is provided to the source of transistor 118 as explained above, but no power is provided to relay 114 since transistor 118 is disabled. As such, relay 114 continues to enable relay 142 (and relay 112) to provide the DRL circuit described above. If, after the predetermined time when power to the gate of transistor 118 is terminated to enable the transistor, wiper switch 34 is in the "ON" position, power flows through transistor 118 to activate relay 114, thereby sealing transistor 118 in conducting operation and activating the full complement of lights as described above.

A photo cell 160 connected to an appropriate power source and exposed to ambient light is connected into the control system at the source of transistor 118 and between diodes 128 and 132. When it gets sufficiently dark, photo cell 160 first disables transistor 118 for a timed delay thru RC time constant 150. After the delay (used to accommodate momentary periods of darkness), transistor 118 is enabled and power flows through the transistor to activate relay 114 and produce the full complement of lights.

As should be apparent from the foregoing, the present system could be implemented using various electrical components other than those depicted in FIG. 3, including a programmable or application specific integrated circuit. Furthermore, while this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. Control system for controlling headlights and windshield wipers of a motor vehicle including an engine and an ignition switch for activating the engine comprising a headlight switch movable between off and on positions for activating the headlights in a full power mode, a windshield wiper switch movable between off and on positions turning the windshield wipers off and on, and control means responsive to movement of the windshield wiper switch from the off position to the on position thereby turning on the windshield wipers to activate the headlights in the full power mode regardless of the position of the headlight switch, said headlights being operable in both a reduced power daylight running mode and in said full power mode, said control means including first actuation means responsive to said ignition switch when both the headlight switch and the windshield wiper switches are in the off positions for activating the headlights in the reduced power daylight running mode, said control means including second actuation means responsive to movement of the windshield wiper switch from the off position to the on position for turning on the headlights in the full power mode.

2. Control system as claimed in claim 1, wherein said headlights include high beam headlights and low beam headlights and said first and said second actuation means include first switching means for connecting said high beam headlights in series to provide said reduced power daylight running mode, said second actuation means controlling said low beam headlights in response to movement of the windshield wiper switch to the on position while simultaneously disconnecting the series connection between the high beam headlights.

3. Control system as claimed in claim 1, wherein said control means includes latching means responsive to activation of the headlights in the full power mode by movement of the windshield wiper switch to the on position to maintain activation of the headlights in the full power mode upon return of the windshield wiper switch to the off position.

4. Control system as claimed in claim 3, wherein said latching means includes means responsive to movement of the headlight switch to the on position and back to the off position to return the headlights to the reduced power daylight running mode.

5. Control system as claimed in claim 1, wherein said vehicle includes a windshield washer system and said control means includes a time delay mechanism delaying activation of the headlights in the full power mode for a predetermined time period after activation of the windshield wipers during activation of the windshield washer system.

6. Control system as claimed in claim 1, wherein said headlights are operable in a reduced power daylight running mode and in said full power mode, said control means including first actuation means responsive to said ignition switch for activating the headlights in the reduced power daylight running mode when the ignition switch is operated to start the motor vehicle.

7. Control system as claimed in claim 6, wherein said control means includes latching means for maintaining said headlight in the full power mode, said latching means including means responsive to movement of the headlight switch to the on position and back to the off position to return the headlights to the reduced power daylight running mode.

8. Control system as claimed in claim 7, wherein said latching means is responsive to the ignition switch to extinguish said headlights when the ignition switch turns off the engine.

9. Control system for controlling headlights and windshield wipers of a motor vehicle including an engine and an ignition switch for activating the engine, said headlights being operable in both a reduced power daylight running mode and a full power mode, comprising a headlight switch movable between off and on positions for activating the headlights in the full power mode, a windshield wiper switch movable between off and on positions turning the windshield wipers off and on, and control means including first actuation means responsive to operation of the ignition switch to start the vehicle for activating said headlights in the daytime running mode, second actuation means responsive to movement of the windshield wiper switch from the off position to the on position thereby turning on the windshield wipers to activate the headlights from the daytime running mode to the full power mode when the headlight switch is in the off position and latching means for latching said headlights in the full power mode after said windshield wiper switch is returned to the off position.

10. Control system as claimed in claim 9, wherein said latching means includes means responsive to movement of the headlight switch from the off position to the on position and then back to the off position to switch said headlights from the full power mode to the daylight running mode.

11. Control system as claimed in claim 10, wherein said headlights include high beam headlights and low beam headlights, said control system including switching means responsive to said ignition switch for switching said high beam headlights in series wherein the high beam headlights define said daylight running mode, said switching means disconnecting said series connection between the high beam headlights when the headlights are actuated in the full power mode.

* * * * *